United States Patent [19]

Heimberg

[11] 4,287,329
[45] Sep. 1, 1981

[54] EMULSION PROCESS FOR PREPARING ELASTOMERIC VINYL ACETATE-ETHYLENE COPOLYMER AND HIGH MOONEY VISCOSITY LOW GEL CONTENT ELASTOMER OBTAINED THEREFROM

[75] Inventor: Manfred Heimberg, Cincinnati, Ohio

[73] Assignee: National Distillers and Chemical Corp., New York, N.Y.

[21] Appl. No.: 132,946

[22] Filed: Mar. 24, 1980

Related U.S. Application Data

[63] Continuation-in-part of Ser. No. 5,069, Jan. 22, 1979, abandoned.

[51] Int. Cl.$^3$ ..................... C08F 2/30; C08F 218/08
[52] U.S. Cl. .......................... 526/202; 260/29.6 B; 260/29.6 BE; 260/29.6 T; 526/209; 526/225; 526/331
[58] Field of Search ............... 526/331, 202, 209, 225; 260/29.6 B, 29.6 BE, 29.6 T

[56] References Cited

U.S. PATENT DOCUMENTS

| | | | |
|---|---|---|---|
| 3,692,723 | 9/1972 | Kasagi et al. | 526/331 |
| 3,714,096 | 1/1973 | Biale | 260/29.4 UA |
| 3,844,990 | 10/1974 | Lindemann et al. | 526/202 |

Primary Examiner—John Kight, III
Attorney, Agent, or Firm—Kenneth D. Tremain

[57] ABSTRACT

In a process for preparing an elastomeric vinyl acetate-ethylene copolymer having high Mooney viscosity and low gel content wherein vinyl acetate monomer is copolymerized with ethylene monomer in an aqueous emulsion reaction medium containing surface active agent, polymerization catalyst and protective colloid to provide a latex and vinyl acetate-ethylene elastomer is recovered from the latex, an improvement is disclosed which comprises:

copolymerizing from about 40% to about 70% by weight of vinyl acetate monomer with from about 60% to about 30% by weight of ethylene monomer in an aqueous emulsion reaction medium to provide a latex, the reaction medium for vinyl acetate-ethylene elastomer containing:

(i) at least one surface active agent having a hydrophilic lipophilic balance value of at least 22 in an amount above about 2.0% by weight of the total monomer,
(ii) a polymerization catalyst, and
(iii) at least one protective colloid in an amount of less than about one part for each part by weight of total surface active agent, with the total weight of the surface active agent and vinyl acetate being present in the reaction medium at the commencement of copolymerization.

13 Claims, No Drawings

EMULSION PROCESS FOR PREPARING ELASTOMERIC VINYL ACETATE-ETHYLENE COPOLYMER AND HIGH MOONEY VISCOSITY LOW GEL CONTENT ELASTOMER OBTAINED THEREFROM

CROSS REFERENCE TO RELATED APPLICATION

This application is a continuation-in-part of copending U.S. patent application Ser. No. 005,069, filed Jan. 22, 1979, now abandoned.

BACKGROUND OF THE INVENTION

Vinyl acetate-ethylene (VAE) copolymers constitute a well known class of synthetic resins demonstrating a broad range of properties depending upon the relative quantities of copolymerized ethylene and vinyl acetate (and other ethylenic monomers which may be present) in the copolymer chain. Elastomeric amorphous VAE gum stocks contain from about 40% to about 70% vinyl acetate by weight randomly distributed throughout the copolymer chain and, when crosslinked, for example, by a peroxide crosslinking agent, possess properties which make them especially useful as elastomers for rubber compounding, as base copolymers for adhesive formulations and as impact modifiers for polyvinyl chloride (PVC). Among the physical and chemical properties which make the rubbery VAE copolymers attractive for such applications are the following: heat aging resistance; oil and solvent resistance; low compression set, good low temperature performance; excellent weatherability and ozone resistance; resistance to natural light; transparent or white-to-black vulcanizates; high loadability; receptance to dielectric heating; and high dampening characteristics. Thus, the elastomeric VAE copolymers are excellent candidates for such automotive applications as gaskets, seals and O-rings, wire insulation, radiator tubing and hose, bumper strips and auto body filler panels and are ideal for other demanding applications as well such as machinery mounts, weather stripping, washing machine hose, refrigerator gaskets, and the like.

In accordance with the present invention, VAE elastomers are obtained in the form of latices employing an improved emulsion copolymerization process and the elastomers are recovered therefrom employing such conventional techniques as coagulation. In general, a VAE copolymer latex is prepared by first charging an aqueous phase containing water, surfactant, buffer, catalyst or catalyst system of the free radical type, and usually a protective colloid such as polyvinyl alcohol (PVA), to a reactor as, for example, described in U.S. Pat. Nos. 3,708,388 and 3,714,096. In some procedures, an initial charge of vinyl acetate monomer, and in others, the entire amount of vinyl acetate monomer, is also charged to the reactor. The reactor is flushed with nitrogen, sealed, and stirring is commenced. Ethylene is then pumped to the reactor until the desired pressure is attained. The reactor can be repressurized one or more times if the batch is carried out under variable ethylene pressure, or a constant pressure can be maintained automatically employing techniques which are well known in the art. After reactor pressure has stabilized, the contents thereof are heated to the polymerization temperature, usually by circulating hot water or steam through a jacket surrounding the reactor. When the desired polymerization temperature (commonly from about 120° to about 165° F.) is reached, temperature is maintained at this level by automated controls. Thereafter, a co-catalyst such as sodium hydrogen sulfite (NaHSO$_3$) can be added to the reactor (if a catalyst system employing a reducing agent to generate free radicals by a redox reaction is used) followed by any remaining vinyl acetate monomer. The completion of polymerization is indicated by cessation of ethylene demand and stabilization of the reactant coolant temperature at about 6°-8° F. above the reactor temperature. Upon completion of polymerization, the reactor contents are cooled and discharged through a pressure let-down valve to a receiving tank at atmospheric pressure from which unreacted ethylene is vented. The finished VAE copolymer latex is passed through a screen of desired mesh to complete the manufacturing process.

Various manipulations of both the amount and nature of the components of a VAE copolymerization medium and the copolymerization process variables have heretofore been attempted in order to optimize one or a few properties of the resulting latex. The emulsion polymerization process of U.S. Pat. No. 4,128,518 employs from 1 to 8% by weight based on the total weight of ethylene and vinyl ester monomers of a polyoxyethylenic nonionic surface active agent preferably one having an HLB (hydrophilic lipopylic balance) value of 5 to 20, as the dispersing agent for the reaction medium. U.S. Pat. No. 3,692,723 describes an emulsion polymerization medium containing a ternary emulsifier one component of which is a nonionic surface active agent having an HLB of from 16 to 21. The use of surface active agents having an HLB below 16 are to be avoided in the process described in U.S. Pat. No. 3,692,723 as an excessively large amount thereof would be required to provide sufficient emulsification effect whereas the use of surface active agents having an HLB higher than 21 are to be avoided in said process as they fail to provide a stable aqueous dispersion. U.S. Pat. No. 3,644,262 describes a copolymerization which by regulating the addition of vinyl acetate to an aqueous emulsifying composition containing a free-radical initiator at a rate which will maintain the concentration of unpolymerized vinyl acetate at a level not exceeding about 3.5% by weight of emulsifying composition and, optionally by delaying the addition of surface active agent, permits the introduction of substantially more ethylene into the copolymer for a given pressure and temperature than would be otherwise attainable. The resulting high ethylene content VAE copolymer latices are said to be better adapted to their end uses than the latices of relatively low ethylene content. A different approach to improved VAE copolymer latices is described in U.S. Pat. No. 3,423,352 in which high solids content VAE copolymer latices of reduced viscosity and improved freeze-thaw stability are obtained by controlling the addition of monomer, catalyst and surfactant. According to this patent, relatively large amounts of surfactant, i.e., from about 3% to about 10% by weight, and catalyst are added to a conventionally prepared polyvinyl acetate latex, having a solids content of up to about 52% and containing relatively large amounts of vinyl acetate, at specified times once polymerization has proceeded to a certain extent. This is said to result in a marked reduction in the viscosity of the emulsion. Frequently, these and other prior art techniques for preparing VAE copolymer latices achieve an improvement in one or two performance characteristics but at the expense of one or more other vital performance characteristics.

In accordance with the emulsion copolymerization process disclosed and claimed in commonly assigned copending U.S. patent application Ser. No. 005,070, filed Jan. 22, 1979, now abandoned, VAE copolymer latices are prepared by copolymerizing from about 60% to about 95% by weight of vinyl acetate with from about 40% to about 5% by weight of ethylene in an emulsion reaction medium containing a surface active agent in an amount of not less than about 1.0% by weight, and not more than about 2.0% by weight, of the total monomer, a catalyst and a protective colloid, the total weight of the surface active agent and vinyl acetate being introduced into the reaction medium in delayed increments prior to and after the commencement of copolymerization. The resulting VAE copolymer latices, which are employed as such as bases for paints and other surface coatings, as adhesives, textile treating agents, and the like, possess high inherent viscosity, i.e., not less than about 1.90, and demonstrate superior performance in the Time of Set Test and Vinyl Wetting Test.

Such properties are especially desirable attributes of a VAE polymer latex. However, where as here VAE elastomers are concerned, other physical properties, significantly, Mooney viscosity and gel content, are dominant considerations in the acceptability of the resins for rubbery articles such as enumerated above.

SUMMARY OF THE INVENTION

The emulsion copolymerization process of this invention provides a relatively simple procedure for obtaining VAE elastomers having high Mooney viscosity and low gel content which are ideally suited materials for fabrication into rubber-like articles meeting fairly demanding performance criteria. The expressions "high Mooney viscosity" and "low gel content" contemplate VAE elastomers having a Mooney viscosity at 212° F. of from about 30 ML (1+4) to about 80 ML (1+4) and preferably from about 30 ML (1+4) to about 70 ML (1+4), and a gel content as measured by insolubility in xylene at 80° C. of not more than about 2%, preferably not more than 1% by weight insolubles.

Broadly stated, the process herein comprises:

(a) copolymerizing from about 40% to about 70% by weight of vinyl acetate monomer with from about 60% to about 30% by weight of ethylene monomer in an aqueous emulsion reaction medium to provide a latex, the reaction medium for VAE elastomer containing:

(i) at least one surface active agent having a hydrophilic lipophilic balance value of at least 22 in an amount above 2.0% by weight of the total monomer, (ii) a polymerization catalyst, and (iii) at least one protective colloid in an amount of less than about one part for each part by weight of total surface active agent, with the total weight of the surface active agent and vinyl acetate being present in the reaction medium at the commencement of copolymerization; and (b) recovering the VAE elastomer from the latex.

Recovery of the VAE elastomer from the latex can be readily accomplished employing well known methods such as coagulating the elastomer by freezing the latex or be adding a coagulating amount of a salt such as sodium chloride to the latex and thereafter filtering the coagulum. The VAE elastomer can then be subjected to further processing, e.g., crosslinking, compounding with antioxidants, stabilizers, fillers, other modifying polymers, etc. Contrary to what one would expect, especially in view of the disclosures of U.S. Pat. No. 3,692,723 which expressly avoids the use of a surface active agent having an HLB value in excess of 21, and U.S. Pat. No. 4,128,518 which prefers a surface active agent having an HLB of from 5 to 20, the use of a surface active agent herein having an HLB value of at least 22 is actually necessary in order to obtain a vinyl acetate/ethylene copolymer having high Mooney viscosity and low gel content.

DESCRIPTION OF THE PREFERRED EMBODIMENTS

The amount of vinyl acetate monomer copolymerized with ethylene monomer will vary from about 40% up to about 70% by weight of the total comonomer charge, the balance of said charge being made up of ethylene, and if desired, small quantities, i.e., up to about 15%, of one or more other ethylenically unsaturated comonomers not exceeding the weight quantity of ethylene. Included among such additional comonomers are monoethylenically unsaturated aliphatic hydrocarbons such as propylene and isobutylene; monoethylenically unsaturated substituted aliphatic hydrocarbons such as vinyl fluoride, vinyl chloride, vinyl bromide, vinylidene fluoride, 1-chloro-1-fluoroethylene, chlorotrifluoroethylene and tetrafluoroethylene; unsaturated acids such as acrylic acid, methacrylic acid, crotonic acid and itaconic acid, as well as polymerizable derivatives thereof, e.g. alkyl acrylates and methacrylates such as methyl acrylates, ethyl acrylate, n-propyl acrylate, n-butyl acrylate, isobutyl acrylate, 2-ethylhexyl acrylate, methyl methacrylate, ethyl methacrylate, n-propyl-methacrylate, 1,6-hexanediol diacrylate and isobutyl methacrylate, acrylonitrile, methacrylonitrile, acrylamide, methacrylamide, N-methylolacrylamide, alkylated N-methylolacrylamides such as N-methoxymethylacrylamide and N-butoxymethylacrylamide, and acrolein; aliphatic vinyl esters such as vinyl formate, vinyl propionate and vinyl butyrate; aliphatic vinyl ethers such as methyl vinyl ether, ethyl vinyl ether and n-butyl vinyl ether; vinyl ketones such as methyl vinyl ketone, ethyl vinyl ketone and isobutyl vinyl ketone; allyl esters of saturated monocarboxylic acids, e.g. allyl acetate, allyl propionate and allyl lactate; and, alkyl esters of monoethylenically unsaturated dicarboxylic acids, e.g., diethyl maleate, dibutyl maleate, dioctyl maleate, dipropyl fumarate, dibutyl fumarate, dioctyl fumarate, dodecyl fumarate, dibutyl itaconate and dioctyl itaconate.

The surface active agents contemplated by this invention include any of the known and conventional surfactants and emulsifying agents, principally the nonionic and anionic materials, and mixtures thereof heretofore employed in the emulsion copolymerization of vinyl acetate and ethylene provided, however, that the HLB value thereof is at least 22, and preferably is at least 25. Surface active agents having HLB values of less than 22 have been found to be ineffective in the process of this invention. One group of nonionic surface active agents which can be employed has a water-insoluble polyoxyalkylene glycol (other than ethylene glycol) nucleus with a molecular weight of more than 900 which has been extended with water-soluble polyoxyethylene groups at each end. The water-soluble portion of the molecule should constitute at least 50% by weight of the total. The polyoxyalkylene glycol can be aliphatic, aromatic or alicyclic in nature, can be saturated or unsaturated, and can be represented by the formula:

$$HO(C_2H_4O)_y(C_mH_nO)_x(C_2H_4O)_yH$$

wherein x, y, m and n are integers. When $(C_mH_nO)x$ is saturated aliphatic, n=2 m.

Compounds in this class are described in U.S. Pat. Nos. 2,674,619 and 2,677,700.

The polyoxyalkylene compounds of U.S. Pat. No. 2,674,619 which can be used herein are defined by the formula:

$$Y[(C_3H_6O)_n—E—H]_x$$

wherein Y is the residue of an organic compound containing therein x active hydrogen atoms, n is an integer, and x is an integer greater than 1.

The values of n and x are such that the molecular weight of the compound, exclusive of E, is at least 900 as determined by hydroxyl number; E is a polyoxyalkylene chain wherein the oxygen/carbon atom ratio is at least 0.5, and E constitutes at least 50% by weight of the compound.

The polyoxyalkylene compounds of U.S. Pat. No. 2,677,700, which are useful herein, are defined by the formula:

$$Y(\overset{R_1}{\underset{R_3}{C}}-\overset{R_2}{\underset{R_4}{C}}-O)_nX$$

wherein Y is the residue of an organic compound containing therein a single hydrogen atom capable of reacting with a 1,3-alkylene oxide; $R_1$, $R_2$, $R_3$ and $R_4$ are selected from the group consisting of H, aliphatic radicals and aromatic radicals, at least one such substituent being a radical other than hydrogen; n is greater than 6.4 as determined by hydroxyl number and X is a water-solubilizing group which is nonionic and constitutes at least 50% by weight of the total compound.

The compounds of U.S. Pat. No. 2,674,619 are sold commercially under the trademark "Pluronic" (BASF Wyandotte Corp.). The following are examples of compounds corresponding to the above formula:

| Name | Molecular weight, polyoxypropylene base | Ethylene oxide content in final product, weight percent | Molecular weight of final product | HLB value |
|---|---|---|---|---|
| pluronic F68 | 1,700 | 80 | 8,750 | 29.0 |
| Pluronic F-98 | 2,700 | 80 | 13,500 | 27.5 |
| Pluronic F-108 | 13,400 | 80 | 12,000–22,000 | 27.0 |

Another group of surface active agents which can be employed has a water-insoluble nucleus with a molecular weight of at least 900 containing an organic compound having a plurality of reactive hydrogen atoms condensed with an alkylene oxide other than ethylene oxide and having water-soluble polyoxyethylene groups attached to each end. The weight percent of the hydrophilic portion of the molecule should be at least 50. These ethylene oxide adducts of an aliphatic diamine such as ethylene diamine extended with propylene oxide have the following formula:

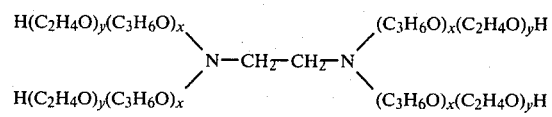

Compounds in this class are described in U.S. Pat. Nos. 2,674,619 and 3,250,719 and are sold commercially under the trademark "Tetronic" (BASF Wyandotte Corp.). The following are examples of compounds corresponding to the above formula:

| Name | Molecular weight for ethylene diamine-propylene oxide base | Ethylene oxide content in final product, weight percent | Molecular weight of final product | HLB value |
|---|---|---|---|---|
| Tetronic 707 | 3,000 | 75 | 12,000 | 27.0 |
| Tetronic 908 | 4,050 | 85 | 27,000 | 28.0 |

Another useful group of nonionics are the "igepals" (GAF Corp. Chemical Products), a homologous series of alkylphenoxypoly (ethyleneoxy) ethanols which can be represented by the general formula:

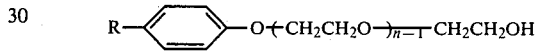

wherein R represents an alkyl radical and n represents the number of mols of ethylene oxide employed, among which are alkylphenoxypoly (ethyleneoxy) ethanols having alkyl groups containing from about 7 to about 18 carbon atoms, inclusive, and having from about 4 to about 100 ethyleneoxy units, such as the heptylphenoxypoly (ethyleneoxy) ethanols; nonylphenoxypoly(ethyleneoxy) ethanols and dodecylphenoxypoly-(ethyleneoxy) ethanols; the sodium or ammonium salts of the sulfate esters of these alkylphenoxypoly (ethyleneoxy) ethanols; alkylpoly(ethyleneoxy) ethanols; alkylpoly(-propyleneoxy)-ethanols; octylphenoxyethoxyethyl-dimethylbenzylammonium chloride; and polyethylene glycol t-dodecylthioether.

Other compounds in this class include ethylene oxide adducts of polyhydroxy alcohols extended with alkylene oxide, e.g., the "Tweens" (ICI United States Inc.), ethylene oxide adducts of polyoxyalkylene esters of polybasic acids, ethylene oxide adducts of polyoxyalkylene extended amides of polybasic acids, ethylene oxide adducts of polyoxyalkylene extended alkyl, alkenyl and alkynyl aminoalkanols, of which the hydrophobic nucleus should have a molecular weight of at least 900 and the hydrophilic part of the molecule should be at least 50% by weight of the total. It is to be understood that the above-mentioned organic compounds having a plurality of active hydrogen atoms as well as the polyoxyalkylene glycols can be aliphatic, aromatic or alicyclic in nature and can contain unsaturation.

Among the many anionic surface active agents which can be used herein are Triton X-200 (Rohm & Haas Co.), a sodium salt of an alkylaryl polyether sulfonate; Triton X-301 (Rohm & Haas Co.), a sodium salt of alkylaryl polyether sulfate; Triton QS-9 (Rohm & Haas Co.), a phosphate ester; Alipal CO 433 (GAF), a sodium salt of sulfated nonylphenol (ethyleneoxy) ethanol;

Dupanol ME Dry (DuPont), a sodium lauryl sulfonate; Ultrawet (Atlantic Refining Co.), an alkyl aryl sulfonate; Sipon ESY (Alcolac, Inc.), a sodium lauryl ethoxylate sulfate; and the like. Sipon ESY, 25.5 percent in aqueous solution, has been found to provide especially good results.

In accordance with this invention, a protective colloid is incorporated in the aqueous emulsions. Such known and conventional protective colloids as: the partially and fully hydrolyzed polyvinyl alcohols; cellulose ethers, e.g., hydroxymethyl cellulose, hydroxyethyl cellulose, ethyl hydroxylethyl cellulose and ethoxylated starch derivatives; the natural and synthetic gums, e.g., gum tragacanth and gum arabic; polyacrylic acid, poly(methyl vinyl ether/maleic anhydride), are well suited for use herein. The partially hydrolyzed polyvinyl alcohols such as Gelvatol 20–30 (Monsanto) are especially advantageous for use in this invention.

The catalysts used in the copolymerization reaction are any of the known and conventional free radical polymerization catalysts heretofore used for the preparation of VAE copolymer latices and include inorganic peroxides such as hydrogen peroxide, sodium perchlorate and sodium perborate, inorganic persulfates such as sodium persulfate, potassium persulfate and ammonium persulfate and reducing agents such as sodium hydrogen sulfite. Catalyst (including co-catalyst reducing agent, if employed) is generally utilized at a level of from about 0.1% to about 1% by weight of total comonomers.

An alkaline buffering agent such as sodium bicarbonate, ammonium bicarbonate, sodium acetate, and the like, may be added to the aqueous system to maintain the pH at the desired value. The amount of buffer is generally about 0.01 to 0.5% by weight, based on the monomers.

The amount of surface active agent useful in this process is at least above about 2.0% by weight of the total monomer and can range as high as about 5.0% by weight of the total monomer although amounts in excess of this are also operable. The weight ratio of protective colloid to total surface active agent is less than about 1.5:1, and preferably less than about 1:1. All of the surface active agent and vinyl acetate monomer may be present in the polymerization medium from the outset as distinguished from other processes in which one or both of these ingredients are added incrementally to the reaction medium during polymerization.

The temperature and pressure of the copolymerization reaction herein can be selected at levels which have heretofore been employed in VAE emulsion copolymerization. Accordingly, temperatures of from about 70° F. to about 160° F. and pressures of 1000 to 5000 p.s.i. can be used with good results. It is, of course, recognized by those skilled in the art that at the lower end of the temperature range, it may be necessary to employ a reducing agent to generate the free radical required for initiating copolymerization.

The VAE elastomer which is recovered from the latex produced in accordance with this invention, preferably after being treated for the removal of residual surface active agent, protective colloid and other extraneous substances, can thereafter be cured with a crosslinking (vulcanizing) agent while compounding with such optional ingredients as fillers; antioxidants; modifying resins (at from about 10% to about 40% by weight of VAE copolymer), e.g., polyvinyl chloride, ethylene propylene rubber (EPR), polychloroprene, polyacrylate rubber, polyurethane, chlorinated polyethylene, polyester, ethylene-propylene diene monomer (EPDM) terpolymer, ethylene-methyl acrylate elastomer, ethylene butyl acrylate elastomer, and acrylonitrile elastomer; and other known elastomer additives. The foregoing can be combined with the VAE elastomer in conventional mixing equipment, typified by a two-roll rubber mill, a mixing extruder or preferably a high shear internal mixer such as a Banbury mixer, until a homogeneous blend is obtained. Upon completion of the mixing stage, the resin blend is processed into any of several forms convenient for subsequent manufacturing operations, for example, pellets formed by an underwater pelletizer, strand cut, etc.

The crosslinking agents which can be used herein include such peroxides as: t-butyl perbenzoate, dicumyl peroxide; 2,5-dimethyl-2,5-di(t-butyl peroxy) hexane; 2,5-dimethyl-2,5-di(t-butyl peroxy) hexyne-3; 1,3,5-tris-[alpha, alpha-dimethyl-alpha-(t-butyl peroxy)]-methyl benzene; alpha, alpha-bis(t-butyl peroxy) diisopropyl benzene; and, n-butyl-4,4-bis(t-butyl peroxy) valerate. These crosslinking agents can be used alone or in combination with any of several polyfunctional auxiliary crosslinking agents such as triallyl phosphate; trimethylol propane triacrylate; diallyl fumarate; triallyl cyanurate; triallyl isocyanurate; pentaerythritol tetraacrylate; trimethylol propane trimethacrylate; 1,3-butylene glycol dimethacrylate; allyl methacrylate; ethylene glycol dimethacrylate; and, 1,3-butylene glycol diacrylate. A preferred curing agent for use herein is Vul-Cup 40 KE (40% dicumyl peroxide on calcium carbonate) from Hercules Inc. The amount of peroxide crosslinking agent can range from about 1.0 to about 10.0 parts, and preferably from about 2.0 parts to about 5.0 parts per hundred parts of EVA copolymer. The polyfunctional auxiliary crosslinking agents are useful within the range of from about 0.1 to about 3.0 parts per hundred parts of EVA gum stock.

Examples of fillers which can advantageously be employed herein are: Hydral 710, an alumina trihydrate obtained from Alcoa; Hi-Sil EP and Hi-Sil 233, amorphous precipitated hydrated silicas obtained from PPG Industries, Inc.; Cab-O-Sil, a fumed silica obtained from Cabot Corporation; Mistron Monomix, a talc (magnesium silicate) from Cyprus Industrial Minerals Company; Burgess KE, a surface treated (silane) calcined kaolin clay (anhydrous aluminum silicate) obtained from the Burgess Pigment Company; and, antimony oxide. As is appreciated by those skilled in the art, the amounts of filler incorporated into a polymer blend of this invention will depend on the nature of the filler and the properties desired of the final product. Non-reinforcing fillers such as alumina trihydrate can be used in amounts ranging from about 5.0 parts to about 400.0 parts and preferably from about 100.0 parts to about 150.0 parts, per hundred parts of polymer blend. Reinforcing fillers such as hydrated silica, carbon black and sintered colloidal silica are useful in the range of from about 5 parts to about 100 parts per hundred parts of polymer blend but the useful upper range is limited by the high viscosity imparted by fillers of this type. The preferred amounts of these reinforcing fillers range from about 20 parts to about 80 parts per hundred parts of polymer blend for hydrated silica and carbon black and from about 10 parts to about 50 parts per hundred parts of polymer blend for sintered colloidal silica.

Any of several known and conventional antioxidants can be incorporated into the polymer blends herein at from about 0.1 parts to about 4.0 parts, and preferably at about 1.0 part, per hundred parts of resin. Agerite MA (R. T. Vanderbilt Company, Inc.), a polymerized trimethyl dihydroquinoline antioxidant, has been used with good results.

Of the following examples in which all percentages are by weight, Examples 1 and 2 demonstrate the critical importance of using both a protective colloid and a surface active agent in the polymerization medium and Examples 3 and 4 demonstrate by way of comparison with the remaining examples which are illustrative of the invention herein, the critical importance of using a surface active agent having a hydrophilic lipophilec balance of at least 22 to obtain a vinyl acetate/ethylene copolymer having high Mooney viscosity and low gel content.

EXAMPLE 1

This example demonstrates that the use of a protective colloid alone yields a polymer with high Mooney viscosity (more than a value of 30) but high gel content. The following solution was prepared:

| Deionized Water | 850 gm |
| --- | --- |
| Gelvatol 20-30 | 45.7 gm |
| Sodium Bicarbonate | 1.13 gm |

(Gelvatol 20-30 is a Monsanto Company polyvinyl alcohol, 87–89% hydrolyzed and of 4.7–5.4 cp viscosity for a 4% solution). The polyvinyl alcohol and the bicarbonate were suspended in the water and the mixture was stirred until complete dissolution was achieved. The solution was sparged with nitrogen for 30 minutes and then 0.04 gm (4 cc of a 1% solution) of ferrous sulfate heptahydrate was added. The solution and:

| Vinyl acetate | 800 gm |
| --- | --- |
| Ammonium persulfate | 3.3 gm dissolved in 50 cc water | were charged to a one-gallon, stainless steel pressure reactor equipped with external electric heating strips, internal cooling coil and agitator. The reactor was then purged with nitrogen to remove all oxygen. The charge was heated to 120° F. During the heat-up period the reactor was stirred at 670 rpm and ethylene was added to a pressure of 2500 psig. When the reaction conditions of pressure and temperature were reached, the polymerization was started by adding 2 gm of sodium bisulfite dissolved in 65 cc of water. The reactor temperature and pressure were kept constant during the run. The polymerization was considered completed 7½ hours after the bisulfite addition, when the demand of ethylene ceased. The emulsion was cooled to room temperature and then the polymer was coagulated from the emulsion by freezing the latex. The coagulated polymer was then dried in an air oven at 120° F.

A vinyl acetate/ethylene copolymer was obtained with the following properties:

| Vinyl acetate content | 59.5% |
| --- | --- |
| Mooney viscosity, ML(1 + 4) at 212° F. | 70.5 |
| Gel content | 42% (xylene 80° C.) |

EXAMPLE 2

This example demonstrates that the use of surface active agent(s) as the sole dispersant yields a polymer with low Mooney viscosity (less than a value of 30) and low gel content. The following solution, after being sparged with nitrogen, was charged to the reactor described in Example 1:

| Deionized Water | 850 gm |
| --- | --- |
| Pluronic F-68 (HLB value of 29.0) | 51.2 gm |
| Sipon ESY | 14 gm |
| Sodium Acetate | 3.2 gm |
| Ferrous Sulfate Heptahydrate | 0.04 gm |

Along with this solution, the following were charged to the reactor:

| Vinyl Acetate | 800 gm |
| --- | --- |
| Ammonium Persulfate | 3.3 gm dissolved in 50 cc $H_2O$ |

The polymerization was carried out in the same way as described in Example 1.

The polymer was coagulated from the emulsion by adding with stirring a hot saturated solution of sodium chloride. The coagulated polymer was washed four times with water and then dried in an air oven at 120° F. The vinyl acetate/ethylene copolymer obtained had the following properties:

| Vinyl acetate content | 55.9% |
| --- | --- |
| Mooney viscosity, ML(1 + 4) at 212° F. | 25 |
| Gel content | 0.32% (xylene 80° C.) |

EXAMPLE 3

This example demonstrates that the use of a surface active agent having an HLB value of less than 22 does not provide a suitable polymer having high Mooney viscosity (greater than a value of about 30). The following were charged to a reactor at 120° F.:

| Deionized Water | 900 gm |
| --- | --- |
| Gelvatol 20-30 | 22.9 gm |
| Pluronic L-64 (HLB value 15.0) | 38.4 gm |
| Sipon ESY | 14.0 gm |
| Ammonium Persulfate | 3.3 gm |
| Ferrous Sulfate Heptahydrate | 0.04 gm |
| Sodium Acetate | 3.2 gm |
| Vinyl Acetate | 800 gm |
| Ethylene | constant 2500 psig |

Along with the above, the following were also charged to the reactor:

| 2gm Sodium Bisulfite in 65 cc water |
| --- |
| 2gm Sodium Bisulfite in 60 cc water |

Following copolymerization as in Example 1 and polymer recovery as in Example 2, a copolymer was obtained which had a Mooney viscosity of 22.5 ML (1+4) at 212° F.

EXAMPLE 4

The same copolymerization reaction medium as in Example 3 was prepared. Catalyst addition was 2 gm sodium bisulfite in 65 cc water followed by 1 gm sodium bisulfite in 30 cc water. The vinyl acetate/ethylene copolymer obtained had a Mooney viscosity of 21 ML (1+4) at 212° F.

EXAMPLE 5

This sample demonstrates that the use of a combination of protective colloid and a surface active agent having an HLB value of at least 22, specifically, an HLB value of 29.0 provides a polymer with high Mooney viscosity and low gel content. The following solution, after being sparged with nitrogen, was charged to the reactor described in Example 1:

|  |  |
|---|---|
| Deionized Water | 850 gm |
| Gelvatol 20-30 | 11.6 gm |
| Pluronic F-68 | 38.4 gm |
| Sipon ESY | 14 gm |
| Sodium Acetate | 3.2 gm |
| Ferrous Sulfate Heptahydrate | 0.04 gm |

Along with this solution the following were charged to the reactor:

|  |  |
|---|---|
| Vinyl acetate | 800 gm |
| Ammonium persulfate | 3.3 gm dissolved in 50 cc Water |

The polymerization was started with 1.08 gm of sodium bisulfite dissolved in 35 cc of water. The remainder of the run was carried out as described in Example 1. The polymer was recovered from the emulsion by coagulating the latex with sodium chloride as described in Example 2.

The vinyl acetate/ethylene copolymer obtained had the following properties:

|  |  |
|---|---|
| Vinyl acetate content | 57.8% |
| Mooney viscosity, ML(1 + 4) at 212° F. | 38.5 |
| Gel content | 0.16% (xylene 80° C.) |

Although the combination of polyvinyl alcohol and surface active agents as practiced in this example would be expected on the basis of prior experience to result in high or low values of *both* Mooney viscosity and gel, or at best some average values of these in the copolymer product, surprisingly, Mooney viscosity was maintained at a desirable level while gel content was actually reduced. In subsequent examples (e.g., Examples 6 and 7), it is demonstrated that gel can be virtually eliminated while attractive Mooney viscosity is achieved by proper protective colloid to surface active agent ratios.

EXAMPLE 6

This example demonstrates that the ratio of concentration of protective colloid to that of surface active agent(s) used as dispersants for Example 5 may be varied within certain limits without affecting substantially desirable polymeric properties of high Mooney viscosity and low gel content. The following solution, after being sparged with nitrogen, was charged to the reactor described in Example 1:

|  |  |
|---|---|
| Deionized Water | 850 gm |
| Gelvatol 20-30 | 24.4 gm |
| Pluronic F-68 | 20.5 gm |
| Sipon ESY | 14 gm |
| Sodium Acetate | 3.2 gm |
| Ferrous Sulfate Heptahydrate | 0.04 gm |

Along with this solution the following were charged to the reactor:

|  |  |
|---|---|
| Vinyl acetate | 800 gm |
| Ammonium persulfate | 3.3 gm dissolved in 50 cc Water |

The polymerization was started with 25 cc of a 3% sodium bisulfite solution. Then, every hour an additional 10 cc of this solution was pumped to the reactor, for a total of six additions. The remainder of the run was carried out as described in Example 1. The polymer was recovered from the latex as described in Example 2.

The vinyl acetate/ethylene copolymer obtained had the following properties:

|  |  |
|---|---|
| Vinyl acetate content | 61.7% |
| Mooney viscosity, ML(1 + 4) at 212° F. | 47 |
| Gel content | All dissolved except for trace of slimy material (not measurable) (xylene 80° C.) |

EXAMPLE 7

In this example, a different ratio of protective colloid/surface active agent(s) is employed. The following solution after being sparged with nitrogen was charged to the reactor described in Example 1:

|  |  |
|---|---|
| Deionized Water | 850 gm |
| Gelvatol 20-30 | 30.9 gm |
| Pluronic F-68 | 17.9 gm |
| Sipon ESY | 14 gm |
| Sodium Acetate | 3.2 gm |
| Ferrous Sulfate Heptahydrate | 0.04 gm |

Along with this solution the following were charged to the reactor:

|  |  |
|---|---|
| Vinyl acetate | 800 gm |
| Ammonium persulfate | 3.3 gm dissolved in 50 cc Water |

The run was carried out following the procedure described in Example 1, using 2 gm of sodium bisulfite dissolved in 65 cc of water to start the polymerization. The polymer was recovered from the latex following the procedure described in Example 2.

The vinyl acetate/ethylene copolymer obtained had the following properties:

|  |  |
|---|---|
| Vinyl acetate content | 62.9% |
| Mooney viscosity, ML(1 + 4) at 212° F. | 37.5 |
| Gel content | less than 0.05% |

EXAMPLE 8

This example demonstrates that the incorporation of t-butyl alcohol in the polymerization reaction medium has no substantial effect on the polymer properties. The following solution, after being sparged with nitrogen, was charged to the reactor described in Example 1:

| | |
|---|---|
| Deionized Water | 760 gm |
| t-butyl alcohol | 90 gm |
| Gelvatol 20-30 | 11.6 gm |
| Pluronic F-68 | 38.4 gm |
| Sipon ESY | 14 gm |
| Sodium Acetate | 3.2 gm |
| Ferrous Sulfate Heptahydrate | 0.04 gm |

Along with this solution the following were charged to the reactor:

| | |
|---|---|
| Vinyl acetate | 800 gm |
| Ammonium persulfate | 3.3 gm dissolved in 50 cc Water |

Following the procedure described in Example 1, the polymerization was started with 2 gm of sodium bisulfite dissolved in 65 cc of water. Then, every two hours an additional 20 cc of this solution were pumped to the reactor for a total of three additions.

The polymer was recovered from the latex following the procedure described in Example 2.

The following vinyl acetate/ethylene copolymer was obtained:

| | |
|---|---|
| Vinyl acetate content | 58.6% |
| Mooney viscosity, ML(1 + 4) at 120° F. | 40 |
| Gel content | Polymer completely soluble in xylene at 80° C. |

EXAMPLE 9

This example demonstrates the use of a higher total concentration of surface active agent. The following solution, after being sparged with nitrogen, was charged to the reactor described in Example 1:

| | |
|---|---|
| Deionized Water | 850 gm |
| Gelvatol 20-30 | 22.9 gm |
| Pluronic F-68 | 38.4 gm |
| Sipon ESY | 14 gm |
| Sodium Acetate | 3.2 gm |
| Ferrous Sulfate Heptahydrate | 0.04 gm |

Along with this solution the following were charged to the reactor:

| | |
|---|---|
| Vinyl acetate | 800 gm |
| Ammonium persulfate | 3.3 gm dissolved in 50 cc Water |

The polymerization was started with 25 cc of a 3% sodium bisulfite solution. Then, every hour an additional 10 cc of this solution was pumped to the reactor for a total of six additions. The remainder of the run was carried out as described in Example 1. The polymer was recovered from the latex as described in Example 2. The vinyl acetate/ethylene copolymer obtained had the following properties:

| | |
|---|---|
| Vinyl acetate content | 56.8% |
| Mooney viscosity, ML(1 + 4) at 212° F. | 50 |

EXAMPLE 10

This example demonstrates the further processing of the elastomers of this invention and the resulting products. The VAE copolymers produced in Examples 5, 6, 8, and 9, were subjected to evaluation as elastomeric products. A commercial high pressure process VAE copolymer elastomer (VYNATHENE EY-907, a U.S. Industrial Chemicals Co. product having about 60 percent vinyl content) was used as a standard. To carry out this evaluation the elastomers were compounded according to the following formulation:

| | |
|---|---|
| Elastomer | 100 phr |
| HiSil 233 | 55 phr |
| Silane A-172* | 1 phr |
| Agerite MA | 1 phr |
| VulCup 40 KE | 3 phr |

*Vinyl tris (betamethoxyethoxy) silane coupling agent (Union Carbide)

The compounding was done on a 6"×12" two-roll rubber mill. The compounds were then press cured into 6"×6"×0.075" plaques in an ASTM mold. The plaques were pressed with 2000 psig pressure at 396° F. for five minutes. The results of the evaluation are indicated in Table I.

TABLE I

| | Tensile Strength psi | % Elong. | (1) Swell Ratio | (1) % Extract |
|---|---|---|---|---|
| Example No. 5 | 2250 | 370 | 5.12 | 8.20 |
| Example No. 6 | 2520 | 420 | 5.28 | 7.30 |
| Example No. 7 | 2320 | 440 | 5.63 | 7.84 |
| Example No. 8 | 2270 | 360 | 5.54 | 7.34 |
| Vynathene EY-907 | 3000 | 280 | 3.62 | 5.46 |

(1) In xylene at 80° C.

EXAMPLE 11

This example demonstrates that the VAE elastomers of this invention can provide cured resins having properties such as elongation and low temperature brittleness (Compound III) which are superior to those commercially available. Using the reaction medium and polymerization conditions described in Example 9, several batches of elastomer were made. The elastomers obtained were blended and subsequently cured using different levels of curing agent and using a coagent in the compounding formulation. The blend had the following properties:

| | |
|---|---|
| Vinyl acetate content | 62.5% |
| Mooney viscosity, ML(H₄) at 212° F. | 37.5 |

Vynathene EY-907 was used as the standard.

The experimental resin and the commercial elastomer were compounded as indicated in Table II as follows:

TABLE II

| | Compound I | Compound II | Compound III |
|---|---|---|---|
| Elastomer | 100 | 100 | 100 |
| HiSil 233 | 55 | 55 | 55 |
| Silane A-172 | 1 | 1 | 1 |
| Agerite MA | 1 | 1 | 1 |
| VulCup 40 KE | 3.75 | 4.5 | 3 |

TABLE II-continued

|  | Compound I | Compound II | Compound III |
|---|---|---|---|
| TAIC (Triallyl isocyanurate) | — | — | 1 |

The amounts are given in parts/100 parts of resin. The products were compounded and cured as indicated previously. The results of the evaluation are indicated in Table III.

TABLE III

|  |  | Tensile Strength psi | Tensile Strength psi (1) | % Elong. | Oil Resist. % Swell Ratio (2) | Swell Ratio (3) | % Extr. (3) | L.T.B. (4) |
|---|---|---|---|---|---|---|---|---|
| Compound I | (a) | 2250 | 640 | 340 | 70 | 4.98 | 8.85 | −22 |
|  | (b) | 2880 | 690 | 260 | 63 | 3.72 | 6.70 | −25 |
| Compound II | (a) | 2370 | 610 | 270 | 61 | 4.11 | 7.64 | −28 |
|  | (b) | 2400 | 660 | 190 | 59 | 3.44 | 5.80 | −30 |
| Compound III | (a) | 2470 | 640 | 220 | 61 | 3.96 | 7.10 | −32 |
|  | (b) | 2440 | 600 | 160 | 51 | 3.01 | 5.57 | −28 |

(a) With experimental VAE copolymer
(b) With commercial VAE copolymer (Vynathene EY-907)
(1) After aging 7 days at 350° F.
(2) ASTM #3 oil, 70 hours at 302° F.
(3) Xylene at 80° C.
(4) Low temperature brittleness °C.

EXAMPLE 12

This example demonstrates that the process of this invention is not limited to the use of a single catalyst system. Thus, the redox catalyst system ammonium persulfate/sodium formaldehyde sulfoxylate reduces polymerization time in comparison to ammonium persulfate/sodium bisulfite, yet produces an entirely acceptable copolymer.

The following solution, after being sparged with nitrogen, was charged to the reactor described in Example 1:

| Deionized Water | 850 gm |
|---|---|
| Gelvatol 20-30 | 22.9 gm |
| Pluronic F-68 | 38.4 gm |
| Sipon ESY | 14 gm |
| Sodium Acetate | 3.2 gm |
| Ferrous Sulfate Heptahydrate | 0.04 gm |

Along with this solution the following was charged to the reactor:

| Vinyl acetate | 800 gm |
|---|---|
| Ammonium persulfate | 3.3 gm dissolved in 50 cc deionized water |

A 0.25% aqueous solution of sodium formaldehyde sulfoxylate was prepared and charged to the catalyst feed tank. Following the same procedure as described in Example 1, the reactor was heated and pressurized with ethylene. When the reactor conditions of temperature and pressure (120° F., 2500 psig) were reached, the polymerization was started by pumping the reducing agent solution to the reactor. The flow was set at approximately 40 cc/hour. The polymerization was considered completed when the ethylene demand ceased, 6 hours after beginning addition of the reducing agent.

The polymer was recovered from the emulsion by coagulating the latex with sodium chloride as described in Example 2.

The VAE copolymer obtained had the following properties:

| Vinyl acetate content | 56.8% |
|---|---|
| Mooney viscosity, ML(1 + 4) at 212° F. | 43.5 |
| Gel content | All dissolved except for trace slimy material not measurable (xylene 80° C.) |

EXAMPLE 13

This example demonstrates the use of the catalyst system ammonium persulfate/sodium hydrosulfite.

The reactor described in Example 1 was charged with the same solution, persulfate and vinyl acetate, as described in Example 12. A 1.5% aqueous solution of sodium hydrosulfite was prepared and charged to the catalyst feed tank.

The reactor was heated and pressurized as described in Example 1. When the reactor conditions of temperature and pressure (120° F., 2500 psig) were reached, the polymerization was started by pumping the reducing agent solution to the reactor. The flow was set at approximately 60 cc/hour. The polymerization was considered completed when the ethylene demand ceased, 5 hours after beginning the addition of the reducing agent.

The polymer was recovered from the emulsion by coagulating the latex with sodium chloride was described in Example 2.

The VAE copolymer that was obtained had the following properties:

| Vinyl acetate content | 56.7% |
|---|---|
| Mooney viscosity, ML(1 + 4) at 212° F. | 46 |
| Gel content | All dissolved except for trace slimy material (not measurable) xylene 80° C. |

EXAMPLE 14

This example demonstrates the use of acrylic acid as a termonomer, and the attendant production of polymer with increased Mooney viscosity without increased gel.

The reactor described in Example 1 was charged with the same solution described in Example 12.

Along with this solution the following was charged to the reactor:

| Vinyl acetate | 800 gm |
|---|---|
| Acrylic acid | 18 gm |
| Ammonium persulfate | 3.3 gm dissolved in 50 cc |

-continued

| | |
|---|---|
| | deionized water |

A 0.25% aqueous solution of sodium formaldehyde sulfoxylate was prepared and charged to the catalyst feed tank.

The reactor was heated and pressurized as described in Example 1. When the reaction conditions of temperature and pressure were reached the polymerization was started by pumping the reducing agent solution to the reactor. The flow was set at approximately 45 cc/hour. The polymerization was considered completed 6½ hours after beginning addition of the reducing agent. The polymer was recovered from the emulsion by coagulating the latex with sodium chloride as described in Example 2.

The vinyl acetate/ethylene/acrylic acid terpolymer that was obtained had the following properties:

| | |
|---|---|
| Vinyl acetate content | 58.1% |
| Mooney viscosity, ML(1 + 4) at 212° F. | 55 |
| Gel content | All dissolved except for trace slimy material (not measurable) xylene 80° C. |

EXAMPLE 15

A vinyl acetate/ethylene/1,6 hexanediol diacrylate terpolymer having unexpectedly low gel content and furnishing improved, cured elastomers is prepared. The following solution was prepared:

| | |
|---|---|
| Deionized Water | 850 gm |
| Gelvatol 20-30 | 22.9 gm |
| Pluronic F-68 | 38.4 gm |
| Sipon ESY | 14 gm |
| Sodium Acetate | 3.2 gm |
| Ferrous Sulfate Heptahydrate | 0.04 gm |

The polyvinyl alcohol, the Pluronic and the sodium acetate were suspended in the water. The mixture was stirred approximately one and one-half hours until complete dissolution of the components. The solution was sparged with nitrogen for 30 minutes and then the Sipon ESY and the ferrous sulfate heptahydrate (1% aqueous solution) were added. The solution plus

| | |
|---|---|
| Vinyl acetate | |
| 1,6 hexanediol diacrylate | |
| Ammonium persulfate | 3.3 gm dissolved in 50 cc Water | were charged to a one-gallon stainless steel pressure reactor equipped with external electric heating strips, internal cooling coil and agitator. The reactor was then purged with nitrogen to remove all oxygen from the system. The charge was heated to 120° F. During the heat-up period the reactor was stirred at 670 rpm and the ethylene was added to a pressure of 2500 psig. The polymerization was then started by adding 30 cc of a 3% sodium bisulfite solution. Then, every hour an additional 10 cc of this solution was pumped to the reactor for a total of six additions. The reaction temperature and pressure were kept constant during the run. The polymerization was considered completed when the ethylene demand ceased, seven and one-half hours after the first sodium bisulfite addition.

The polymer was coagulated from the emulsion by adding under stirring a hot saturated sodium chloride solution. The coagulated polymer was then washed four times with warm water and dried in an air oven at 120° F.

This procedure was used to make several runs with increasing concentration of 1,6-hexanediol diacrylate. Table IV below sets forth the amounts of vinyl acetate and 1,6-hexanediol diacrylate used in each run.

TABLE IV

| Run No. | Gm of Vinyl Acetate | Gm of 1,6-Hexanediol Diacrylate | % of 1,6-Hexanediol Diacrylate Based on Vinyl Acetate |
|---|---|---|---|
| 1 | 800 | 1 | 0.125 |
| 2 | 800 | 4 | 0.5 |
| 3 | 800 | 8 | 1 |
| 4 | 800 | 16 | 2 |
| 5 | 800 | 32 | 4 |
| 6 | 750 | 75 | 10 |
| 7* | 670 | 140 | 20 |

*Product coagulated in the reactor.

Table V below summarizes the properties of the polymers made in these runs.

TABLE V

| Run No. | Vinyl Acetate % in Polymer | Mooney Viscosity ML (1 + 4) at 212° F. | % 1,6-Hexanediol Diacrylate in Polymer | Gel Content % |
|---|---|---|---|---|
| 1 | 60.4 | 37 | — | 0 |
| 2 | 59.0 | 34.5 | — | 0 |
| 3 | 60.5 | 35 | — | 0 |
| 4 | 60.3 | 41 | 1.8–2.4 | 0 |
| 5 | 60.3 | 38.5 | 3.9–4.5 | 0 |
| 6 | 59.9 | 35.5 | 4.2 | 0 |
| 7 | 56.9 | 37.5 | 5.8 | 0 |

The polymers made in these runs were subjected to evaluation as an elastomeric product. A commercial VAE copolymer elastomer (VYNATHENE EY-907, Table III) was used as the standard. To carry out this evaluation, the resins were compounded and cured according to the procedure of Example 10. Results of the evaluation are set forth in Table VI as follows:

TABLE VI

| Run No. | Tensile Strength psig | Tensile Strength psig (1) | % Elong. | Oil Resist., % Swell Ratio (2) | Swell Ratio (3) | % Extr. (3) |
|---|---|---|---|---|---|---|
| EY-907 | 2740 | 710 | 280 | 67 | 3.82 | 7.08 |
| 1 | 2230 | 690 | 490 | 89 | 5.73 | 6.36 |
| 2 | 2190 | 690 | 480 | 94 | 5.97 | 9.12 |
| 3 | 2360 | 690 | 490 | 91 | 5.72 | 9.50 |
| 4 | 2370 | 730 | 480 | 75 | 5.60 | 8.98 |
| 5 | 2190 | 810 | 370 | 83 | 4.58 | 9.45 |
| 6 | 2380 | 990 | 410 | 81 | 5.21 | 8.85 |

(1) After aging 7 days at 350° F.
(2) ASTM #3 oil, 70 hours at 302° F.
(3) Xylene at 80° C.

It is readily seen that the terpolymer elastomers furnish high elongation with the cured rubbers having improved resistance to loss of tensile strength upon heat aging at 350° F. This combination of properties is surprising since the diacrylate monomer, a crosslinking monomer, would be expected to reduce elongation in the compound.

What is claimed is:

1. In a process for preparing elastomeric vinyl acetate-ethylene copolymers having a Mooney viscosity value greater than about 30 and low gel content wherein vinyl acetate monomer is copolymerized with ethylene monomer in an aqueous emulsion reaction medium containing surface active agent, polymerization catalyst and protective colloid to provide a latex and vinyl acetate-ethylene elastomer is recovered from the latex, the improvement which comprises copolymerizing from about 40% to about 70% by weight of vinyl acetate monomer with from about 60% to about 30% by weight of ethylene monomer in an aqueous emulsion reaction medium to provide a latex, the reaction medium for vinyl acetate-ethylene elastomer containing:

(i) at least one surface active agent having a hydrophilic lipophilic balance value of at least 22 in an amount above about 2.0% by weight of the total monomer, (ii) a polymerization catalyst, and (iii) at least one protective colloid in an amount of less than about one part for each part by weight of total surface active agent, with the total weight of the surface active agent and vinyl acetate being present in the reaction medium at the commencement of copolymerization.

2. The process of claim 1 wherein the surface active aent has a hydrophilic lipophilic balance value of at least 25.

3. The process of claim 1 wherein the Mooney viscosity of the copolymer obtained therefrom at 212° F. is from about 30 ML(1+4) to about 80 ML(1+4).

4. The process of claim 3 wherein the Mooney viscosity of the copolymer obtained therefrom at 212° F. is from about 30 ML(1+4) to about 70 ML (1+4).

5. The process of claim 1 wherein the gel content of the copolymer obtained therefrom as measured by insolubility in xylene at 80° C. is not more than about 2%.

6. The process of claim 5 wherein the gel content of the copolymer obtained therefrom as measured by insolubility in xylene at 80° C. is not more than about 1%.

7. The process of claim 1 wherein another ethylenically unsaturated monomer up to about 15% by weight of the total monomer charge not exceeding the weight of ethylene is copolymerized.

8. The process of claim 7 wherein the ethylenically unsaturated monomer is 1,6-hexanediol diacrylate.

9. The process of claim 1 wherein the surface active agent is a nonionic polyalkyleneoxy surface active agent.

10. The process of claim 1 wherein the surface active agent is an alkali metal aliphatic ether sulfate.

11. The process of claim 1 wherein the protective colloid is a partially hydrolyzed polyvinyl alcohol.

12. The elastomeric vinyl acetate-ethylene-1,6-hexanediol diacrylate terpolymer of claim 8.

13. The crosslinked elastomeric vinyl acetate-ethylene-1,6-hexanediol diacrylate terpolymer of claim 12.

* * * * *